US010623450B2

(12) United States Patent
Murphy et al.

(10) Patent No.: US 10,623,450 B2
(45) Date of Patent: Apr. 14, 2020

(54) ACCESS TO DATA ON A REMOTE DEVICE

(71) Applicant: Accenture Global Solutions Limited, Dublin (IE)

(72) Inventors: Colm Aengus Murphy, Dublin (IE); Mark Cunningham, Kilcoole (IE)

(73) Assignee: Accenture Global Solutions Limited, Dublin (IE)

( * ) Notice: Subject to any disclaimer, the term of this patent is extended or adjusted under 35 U.S.C. 154(b) by 447 days.

(21) Appl. No.: 15/366,918

(22) Filed: Dec. 1, 2016

(65) Prior Publication Data

US 2018/0159902 A1 Jun. 7, 2018

(51) Int. Cl.
*H04L 29/06* (2006.01)
*H04L 29/08* (2006.01)

(52) U.S. Cl.
CPC ........ *H04L 65/1069* (2013.01); *H04L 63/029* (2013.01); *H04L 67/02* (2013.01); *H04L 67/141* (2013.01); *H04L 67/2823* (2013.01); *H04L 67/42* (2013.01); *H04L 63/0281* (2013.01)

(58) Field of Classification Search
CPC ... H04L 67/42; H04L 67/2823; H04L 67/141; H04L 63/029; H04L 65/1069; H04L 67/02; H04L 63/0281
See application file for complete search history.

(56) References Cited

U.S. PATENT DOCUMENTS

| | | | | |
|---|---|---|---|---|
| 2012/0023090 A1* | 1/2012 | Holloway | ............... | H04L 67/28 707/709 |
| 2013/0275492 A1* | 10/2013 | Kaufman | ............... | H04L 63/029 709/203 |
| 2014/0075541 A1* | 3/2014 | Young | ................. | H04L 12/6418 726/14 |
| 2015/0095777 A1* | 4/2015 | Lim | ........................ | H04L 67/02 715/716 |
| 2016/0028688 A1* | 1/2016 | Chizhov | ............... | H04L 63/029 726/12 |

(Continued)

FOREIGN PATENT DOCUMENTS

| | | |
|---|---|---|
| WO | 2015/119529 | 8/2015 |
| WO | 2015/121342 | 8/2015 |

OTHER PUBLICATIONS

GitHub, "Stream for Socket.IO," https://github.com/nkzawa/socket.io-stream, Jun. 25, 2013, 5 pages.

(Continued)

*Primary Examiner* — Abdulkader M Alriyashi
(74) *Attorney, Agent, or Firm* — Harrity & Harrity, LLP

(57) ABSTRACT

A first device may receive connection requests to establish communications between a second device located behind a firewall and a third device located outside of the firewall. The first device may be located outside of the firewall. The second device and the third device may store data. The first device may receive a request for the data. The first device may provide the request via a first connection or a second connection. The device may receive the data. The data stored by the second device may be received by the first device from behind the firewall without using a tunnel through the firewall and in a streaming manner. The first device may provide the data. The data stored by the third device may be provided to the second device in the streaming manner.

20 Claims, 5 Drawing Sheets

(56) References Cited

U.S. PATENT DOCUMENTS

| | | | |
|---|---|---|---|
| 2016/0057211 A1 | 2/2016 | Thapliyal et al. | |
| 2016/0080502 A1* | 3/2016 | Yadav | G06F 16/285 |
| | | | 709/227 |
| 2018/0159901 A1* | 6/2018 | Chatras | H04L 65/1016 |

OTHER PUBLICATIONS

Crossbar.io, "Networking for Microservices," http://crossbar.io/, Sep. 17, 2015, 12 pages.

Wikipedia, "Web Application Messaging Protocol," https://en.wikipedia.org/wiki/Web_Application_Messaging_Protocol, Nov. 3, 2016, 7 pages.

Express, "Serving static files in Express," https://expressjs.com/en/starter/static-files.html, Dec. 1, 2015, 2 pages.

Apple, "HTTP Live Streaming," https://developer.apple.com/streaming/, May 9, 2013, 2 pages.

Sourceforge, "HttpBridge," http://httpbridge.sourceforge.net/, Oct. 26, 2003, 2 pages.

GitHub, "SSH to WebSockets Bridge," https://github.com/aluzzardi/wssh, Jul. 23, 2012, 3 pages.

Wikipedia, "HTTP/1.1 Upgrade header," https://en.wikipedia.org/wiki/HTTP/1.1_Upgrade_header, Nov. 24, 2016, 2 pages.

GitHub, "WebSocket Universal Message Router," https://github.com/cjus/umf_router, Dec. 6, 2013, 3 pages.

Wikipedia, "Data stream," https://en.wikipedia.org/wiki/Data_stream, Dec. 1, 2016, 1 page.

Wikipedia, "Wowza Streaming Engine," https://en.wikipedia.org/wiki/Wowza_Streaming_Engine, Oct. 15, 2016, 4 pages.

Wikipedia, "Pipeline (computing)," https://en.wikipedia.org/wiki/Pipeline_(computing), Nov. 4, 2016, 4 pages.

Wikipedia, "HTTP tunnel," https://en.wikipedia.org/wiki/HTTP_tunnel, Nov. 1, 2016, 3 pages.

Australian Search Report corresponding to AU Application No. 2017265064, dated Mar. 15, 2018, 4 pages.

European Search Report corresponding to EP Application No. 17201799.8, dated Mar. 12, 2018, 10 pages.

\* cited by examiner

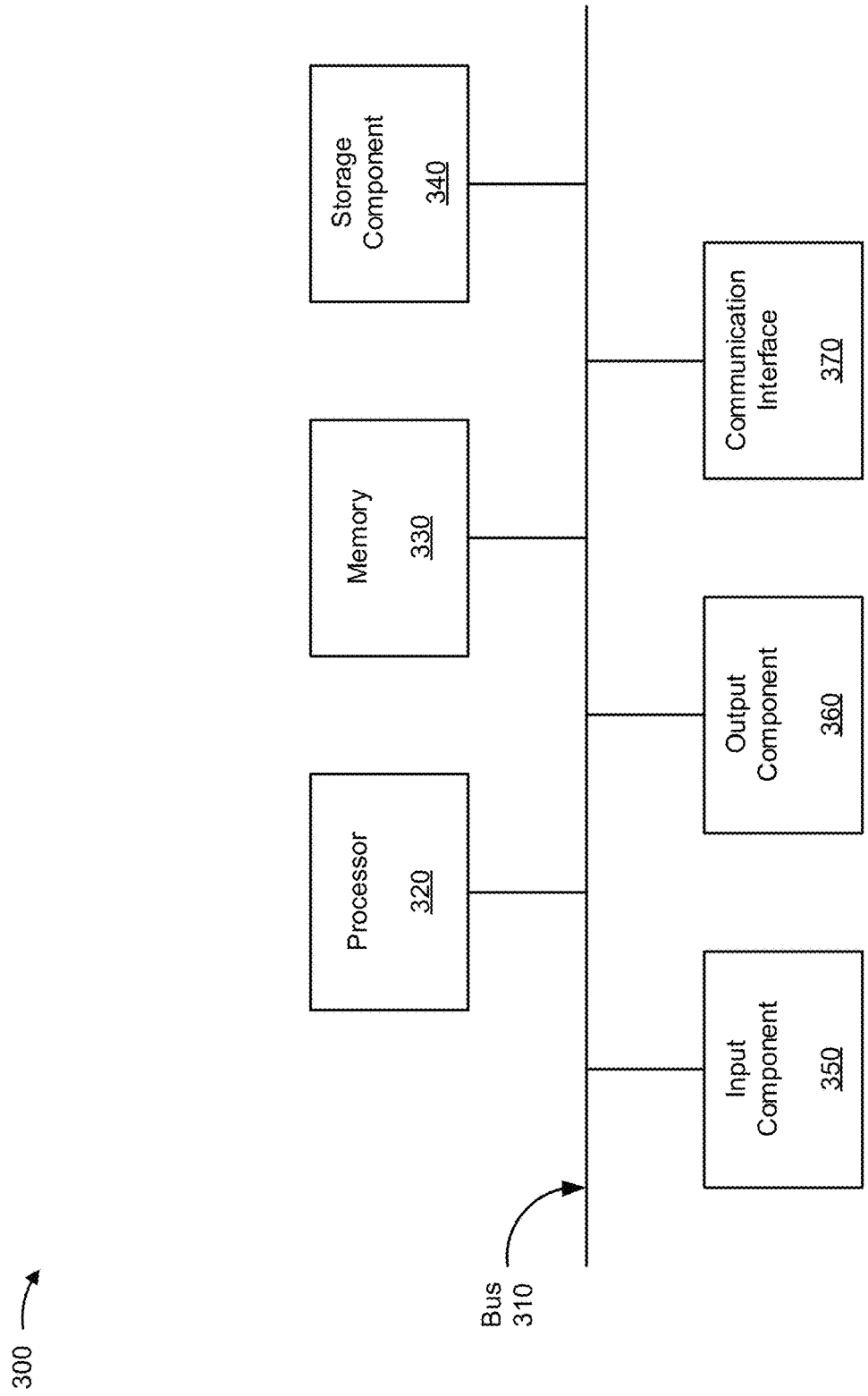

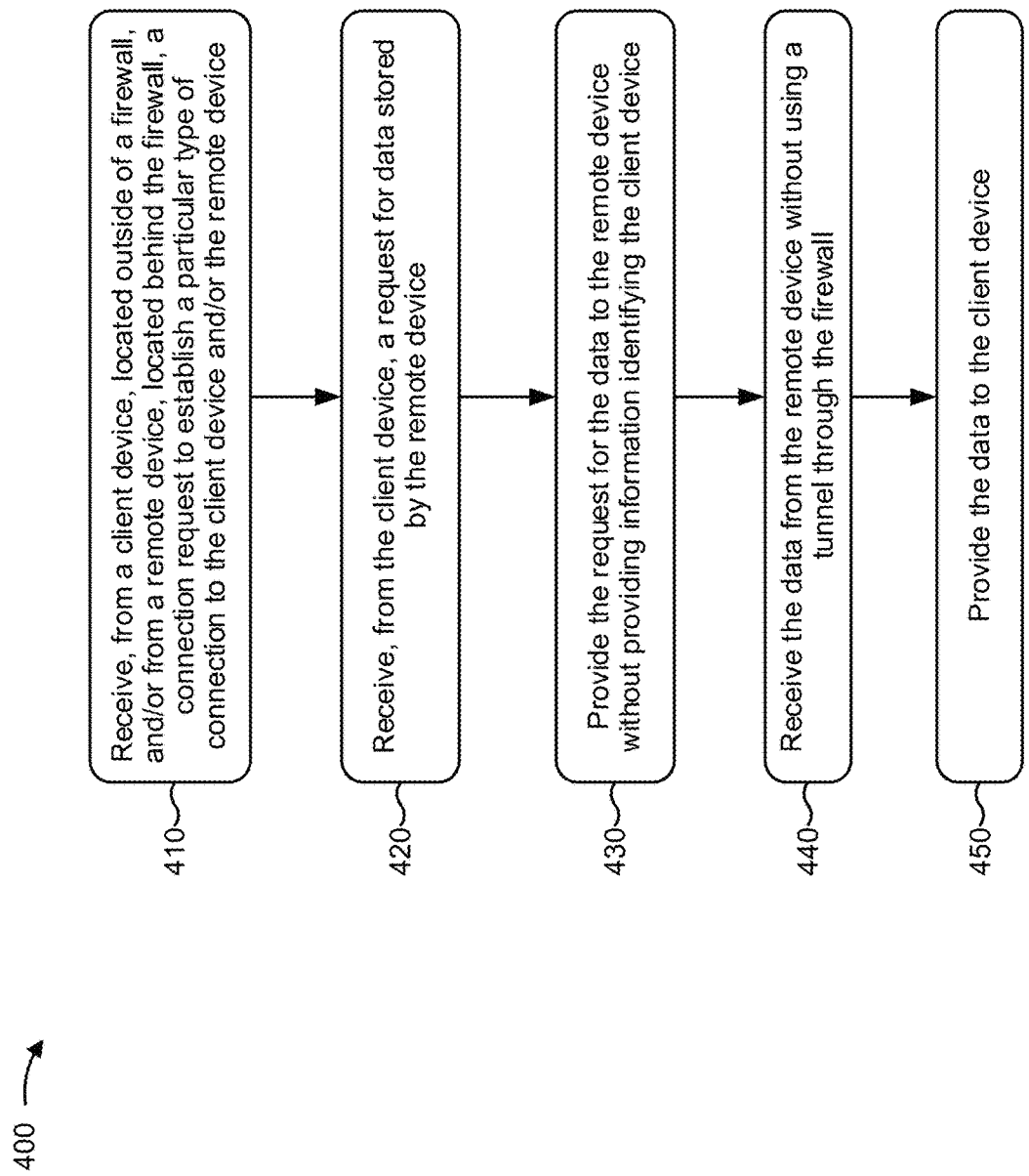

ACCESS TO DATA ON A REMOTE DEVICE

BACKGROUND

WebSocket is a communications protocol, providing full-duplex communication channels over a single transmission control protocol (TCP) connection. WebSocket may be implemented in browsers and servers, and may further be used by any client or server application. WebSocket is an independent TCP-based protocol. A WebSocket handshake may be interpreted by a hypertext transfer protocol (HTTP) server as an Upgrade request.

The WebSocket protocol may make more interaction between a browser and a server possible, facilitating the real-time data transfer from and to the server. This is made possible by providing a standardized way for the server to send content to the browser without being solicited by the client, and allowing for messages to be passed back and forth while keeping the connection open. In this way, a two-way (bi-directional) ongoing conversation can take place between a browser and the server.

SUMMARY

According to some possible implementations, a device may include one or more processors to receive multiple connection requests to establish multiple connections between multiple devices. A first connection request, of the multiple connection requests, may be received from a first device, of the multiple devices, located behind a firewall. A second connection request, of the multiple connection requests, may be received from a second device, of the multiple devices, located outside of the firewall. The multiple connections may include a first connection, associated with the first connection request, and a second connection that is associated with the second connection request. The one or more processors may receive, from the first device or the second device, a request associated with data stored by the first device or the second device after establishing the multiple connections. The data may include video data, audio data, or text data. The request associated with the data may include information that identifies the first device or the second device as a destination of the request.

The one or more processors may provide the request to the first device or the second device using the information that identifies the first device or the second device as the destination of the request based on receiving the request from the first device or the second device. The one or more processors may receive the data from the first device or the second device based on providing the request to the first device or the second device. The data from the first device may be received from the first device from behind the firewall in a streaming manner, and/or the data from the second device may be provided to the first device in the streaming manner. The one or more processors may provide, to the first device or the second device, the data based on receiving the data from the first device or the second device. The one or more processors may perform an action related to the data other than providing the data to the first device or the second device.

According to some possible implementations, a method may include receiving, by a first device, a plurality of connection requests to establish communications between a second device located behind a firewall and a third device located outside of the firewall. The first device may be located outside of the firewall. The second device and the third device may store data to be requested. A first connection may be established between the first device and the second device based on the plurality of connection requests. A second connection may be established between the first device and the third device based on the plurality of connection requests. The method may include receiving, by the first device and from the second device or the third device, a request for the data based on receiving the plurality of connection requests. The request for the data stored by the second device may be received via the second connection. The request for the data stored by the third device may be received via the first connection. The method may include providing, by the first device, the request via the first connection or the second connection based on receiving the request. The method may include receiving, by the first device, the data based on providing the request. The data stored by the second device may be received by the first device from behind the firewall without using a tunnel through the firewall and in a streaming manner. The method may include providing, by the first device, the data based on receiving the data. The data stored by the third device may be provided to the second device in the streaming manner.

According to some possible implementations, a non-transitory computer-readable medium may store one or more instructions that, when executed by one or more processors, cause the one or more processors to receive one or more requests to establish one or more connections between multiple devices. A first connection of the one or more connections may be associated with connecting to a first device located behind a firewall. A second connection of the one or more connections may be associated with connecting to a second device located outside of the firewall. The one or more connections to be used to provide data to or from the first device without using a tunnel through the firewall. The one or more instructions may cause the one or more processors to receive a request for the data after receiving the one or more requests. The one or more instructions may cause the one or more processors to process the request to identify the first device or the second device as a destination for the request based on receiving the request.

The one or more instructions may cause the one or more processors to provide the request to the first device or the second device based on processing the request. The one or more instructions may cause the one or more processors to receive the data from the first device or the second device based on providing the request to the first device or the second device. The data from the first device may be received from behind the firewall and in a streaming manner. The data may include media data. The one or more instructions may cause the one or more processors to provide the data to the first device or the second device based on receiving the data from the first device or the second device. The data provided to the first device may be provided in the streaming manner.

BRIEF DESCRIPTION OF THE DRAWINGS

FIG. 3 is a diagram of example components of one or more devices of FIG. 2; and

FIG. 4 is a flow chart of an example process for accessing data on a remote device.

DETAILED DESCRIPTION

The following detailed description of example implementations refers to the accompanying drawings. The same reference numbers in different drawings may identify the same or similar elements.

A firewall is often implemented to protect data from being accessed by unauthorized users. For example, data may be stored on a remote device (e.g., a remote storage device) behind a firewall, thus protecting access to the data by unauthorized users located outside of the firewall. While a firewall provides a level of security, a firewall may also complicate a data transfer, delay a data transfer, and/or consume additional resources for providing access to data to authorized users outside of the firewall. For example, a tunnel (e.g., a proxy tunnel or a hypertext transfer protocol (HTTP) tunnel) may need to be established in order for devices outside of the firewall to access data located behind the firewall (e.g., on a remote device). Further, a remote device behind the firewall may need to establish a connection with a client device outside of the firewall to provide data to the client device. For example, the remote device may need to know the identity of the client device outside of the firewall that needs the data in order to establish a connection with the client device. This reduces an efficiency of providing the data to the client device as the remote device has to know in advance that the client device is to receive the data.

Implementations, described herein, permit a client device outside of a firewall to establish a data stream to pull data stored behind the firewall on a remote device (e.g., from a storage device located behind the firewall) without the need for a tunnel through the firewall. In addition, data may be pulled without the need for the remote device to have knowledge of the identity of the client device, and without the need for the remote device to establish a connection with the client device from behind the firewall. In this way, efficiency of obtaining data from behind a firewall is increased (e.g., since the identity of a client device may not be needed by the remote device so as to push the data from behind the firewall). Further, security may be increased by eliminating the need for a tunnel via the firewall to permit a client device to pull data from behind the firewall.

Figure 1A:
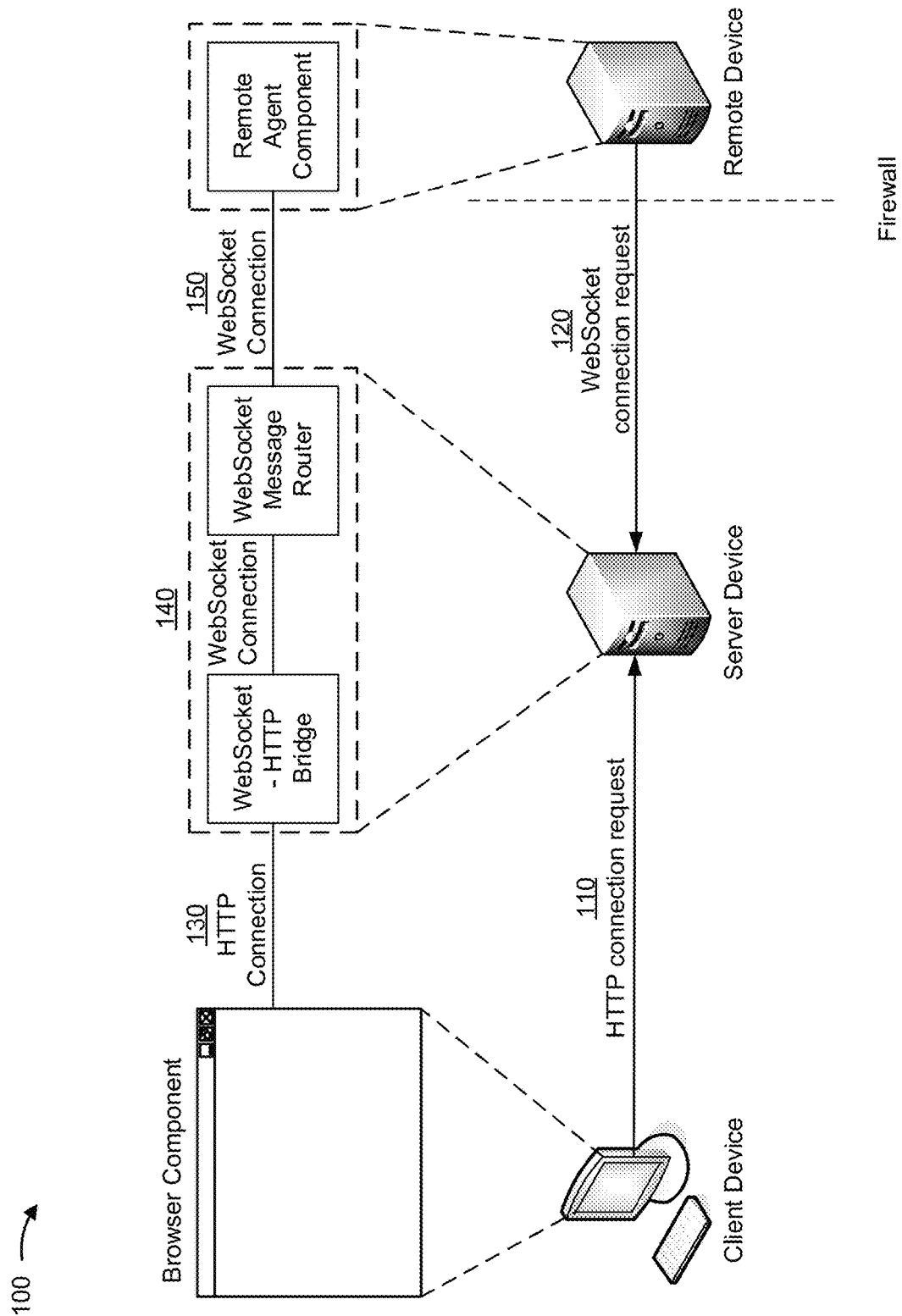
FIGS. 1A and 1B are diagrams of an overview of an example implementation described herein.
Figure 1B:
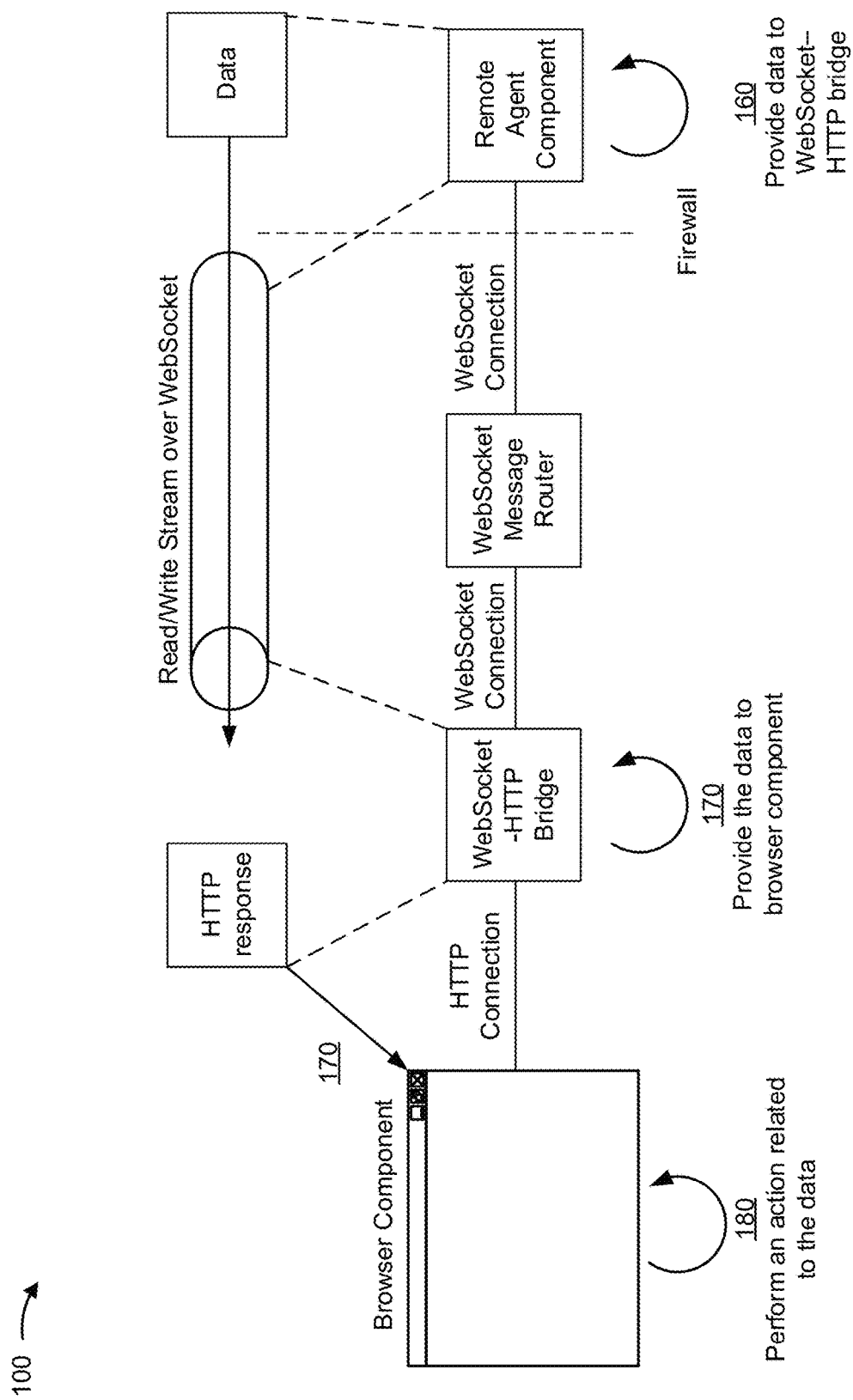

FIGS. 1A and 1B are diagrams of an overview of an example implementation 100 described herein. As shown by reference number 110 in FIG. 1A, a client device may provide (e.g., via a web browser component) an HTTP connection request to a server device. In some implementations, the HTTP connection request may include a request to access data stored by a remote device behind a firewall. For example, a user of the client device may request data stored by the remote device via typing a uniform resource locator (URL) that includes information identifying the data into a browser component. In some cases, the server device may receive thousands, millions, or billions of HTTP connection requests from thousands, millions, or billions of client devices.

As shown by reference number 120, the server device may receive a WebSocket connection request from the remote device. For example, the remote device may request to establish the connection based on receiving an indication to establish the connection from a user of the remote device, automatically based on being connected to a network, and/or the like. The server device may receive thousands, millions, or billions of WebSocket connection requests from thousands, millions, or billions of remote devices (or remote agent components of the remote device).

As shown by reference number 130, the server device may establish an HTTP connection with the client device using a network device implemented on the server device. For example, the network device may provide integration or bridging services between multiple protocols (e.g., between HTTP and WebSocket) and may be referred to herein as a "WebSocket-HTTP bridge". As shown by reference number 140, server device may establish a connection between the network device and another network device implemented on the server device. For example, the server device may establish a WebSocket connection between the WebSocket-HTTP bridge and a network device that can forward a request for data to the appropriate remote device (or remote agent component of the remote device) (referred to herein as a "WebSocket message router"). In this way, the server device may permit compatibility between two different types of connections (e.g., an HTTP connection and a WebSocket connection).

As shown by reference number 150, the WebSocket message router may establish a WebSocket connection with a remote agent component of the remote device (e.g., software of the remote device). The server device (e.g., using the WebSocket message router) may store information identifying the connection between the WebSocket message router and the remote agent component of the remote device to permit a lookup of the WebSocket connection. In this way, an end-to-end connection may be established between the client device and the remote device via the server device, using multiple types of connection protocols (e.g., HTTP and WebSocket connection protocols).

As shown by reference number 160 in FIG. 1B, the remote agent component may access data (e.g., stored by the remote device), such as video or audio data, and may provide the data to the WebSocket-HTTP bridge of the server device. For example, the remote agent component may provide the data to the WebSocket-HTTP bridge via the WebSocket connection between the remote agent component and the WebSocket message router, and via the WebSocket connection between the WebSocket message router and the WebSocket-HTTP bridge. As further shown, when the remote agent component provides the data, the remote agent component may provide the data using a read/write stream over WebSocket, where the data is read from a file of the remote device and written to a data stream between the remote agent component and the WebSocket-HTTP bridge.

The remote agent component may provide the data via the read/write stream in a streaming manner, as described in more detail below. For example, the remote agent component may provide the data in chunks or portions. In some implementations, the chunks or portions may be of a threshold or particular size (e.g., a threshold quantity of kilobytes (KB), a threshold quantity of megabytes (MB), etc.). In some implementations, when data is provided in this manner, the server device may not store the entire amount of data at any one time. For example, when data is streamed through the server device, the data may be streamed without all of the data being stored on the server device at the same time. This conserves memory resources of the server device by reducing an amount of data that the server device is storing when providing data.

As shown by reference number 170, the WebSocket-HTTP bridge may provide the data to the client device (e.g., in the form of an HTTP response), for display via the browser component, via the HTTP connection between the WebSocket-HTTP bridge and the browser component. As shown by reference number 180, the browser component and/or the client device may perform an action related to the data. For example, the browser component may display the data, the browser component may play the data (e.g., when the data is video or audio data), the browser component may provide various options, related to the data, for a user of the client device to select (e.g., store the data, provide the data to another device, etc.). In some implementations, the server device may perform an action related to the data. For example, the server device may perform an analysis on the data, the connections used to received and/or provide the data, and/or the like.

In this way, a client device in front of a firewall may obtain data stored by a remote device behind the firewall without the need for a tunnel through the firewall (e.g., a proxy tunnel or an HTTP tunnel that permits data to be pulled through the firewall at a particular port so as to avoid a firewall policy that would prevent pulling of the data through the firewall). In addition, data may be received by the client device without the need for the remote device to have knowledge of the identity of the requesting client device, and without the need for the remote device to establish a connection with the requesting client device from behind the firewall. In this way, efficiency of obtaining data from behind a firewall is increased (e.g., because the identity of a requesting client device may not be needed by the remote device so as to push the data from behind the firewall). Further, security may be increased by eliminating the need for a tunnel via the firewall so that a requesting client device may pull data from behind the firewall.

As indicated above, FIGS. 1A and 1B are provided merely as an example. Other examples are possible and may differ from what was described with regard to FIGS. 1A and 1B. For example, a streaming engine (or media server), such as a Wowza streaming engine, may be located between the client device and the server device. In some implementations, the streaming engine may be capable of handling thousands, millions, or billions of requests for data when the server device is not capable of handling that quantity of requests during a time period. In some implementations, the streaming engine may cache data received from the server device and provide the data to the client device via HTTP live streaming. This improves communication of the data by reducing or eliminating crashes of the server device due to the server device receiving a threshold quantity of requests in a particular amount of time.

In addition, although FIGS. 1A and 1B describe an implementation where data is provided from a remote device to a client device, other implementations are possible and may relate to the client device providing the data to the remote device (e.g., via the read/write stream over WebSocket). This increases an efficiency of bi-directional communications.

Figure 2:
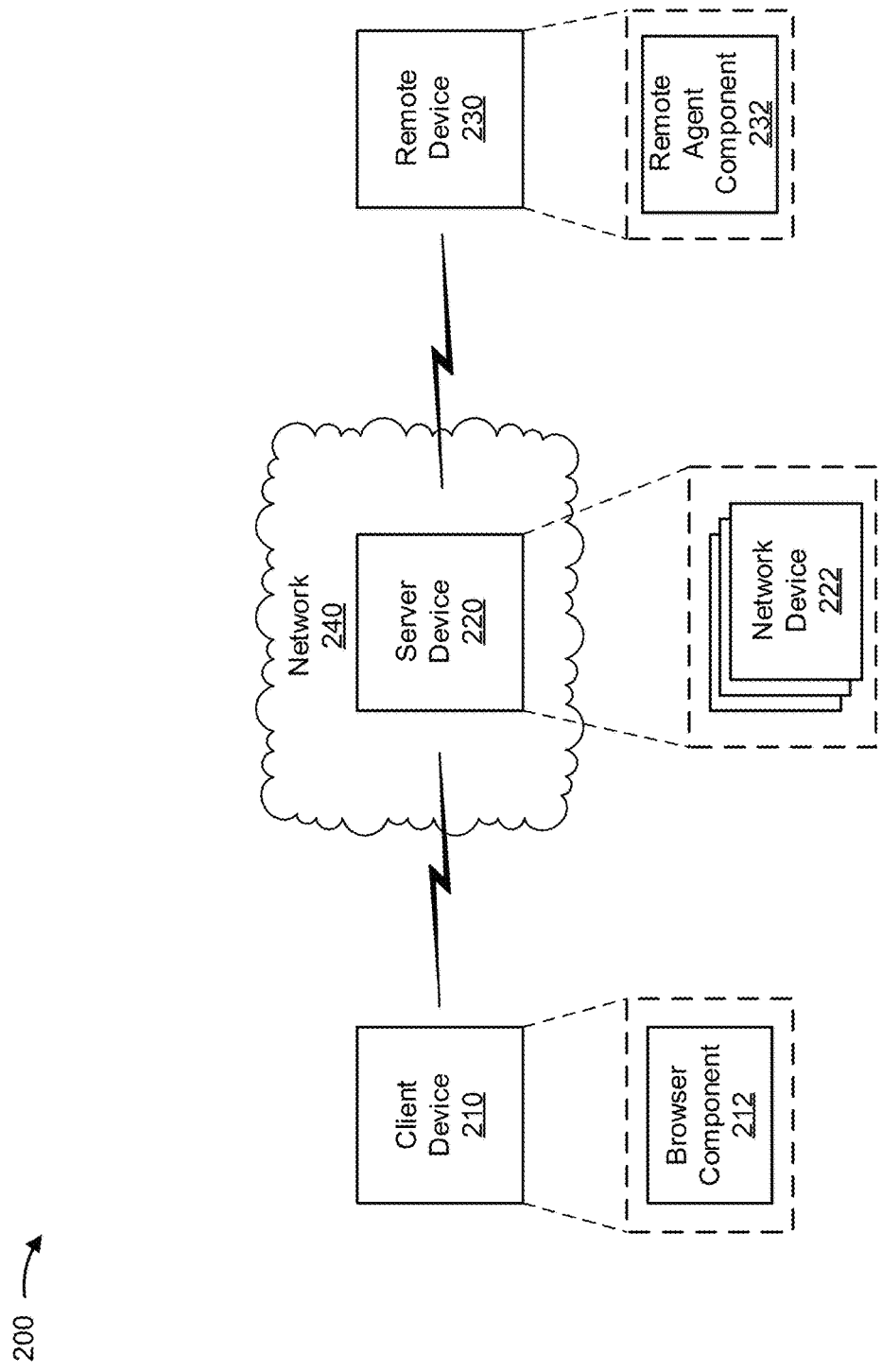
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a browser component 212, a server device 220, a network device 222, a remote device 230, a remote agent component 232, and a network 240. Devices of environment 200 may interconnect via wired connections, wireless connections, or a combination of wired and wireless connections.

Client device 210 includes one or more devices capable of receiving, generating, storing, processing, and/or providing information associated with a request for data. For example, client device 210 may include a communication and computing device, such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), and/or a similar type of device. In some implementations, client device 210 may provide a connection request to server device 220 (e.g., to network device 222 of server device 220) using browser component 212, as described elsewhere herein. Additionally, or alternatively, client device 210 may receive data from server device 220 via the connection, as described elsewhere herein.

Browser component 212 includes one or more components capable of requesting, receiving, generating, storing, processing, and/or providing information associated with a request for data. For example, browser component 212 may include a web browser component, a file browser component, and/or a similar type of component that is at least partially implemented in hardware. In some implementations, browser component 212 may provide a connection request and/or information identifying data (e.g., a uniform resources identifier (URI), such as a uniform resource locator (URL) or a uniform resource name (URN)) to server device 220 (e.g., to network device 222 of server device 220), as described elsewhere herein. Additionally, or alternatively, browser component 212 may display data received from server device 220, as described elsewhere herein.

Server device 220 includes one or more devices capable of receiving, storing, generating, processing, and/or providing information associated with a request for data. For example, server device 220 may include a server (e.g., in a data center or a cloud computing environment), a data center (e.g., a multi-server micro data center), a workstation computer, a virtual machine (VM) provided in a cloud computing environment, a streaming engine, a media server, or a similar type of device. In some implementations, server device 220 may include a communication interface that allows server device 220 to receive information from and/or transmit information to other devices in environment 200. In some implementations, server device 220 may receive a connection request and/or a request for data from client device 210, as described elsewhere herein. Additionally, or alternatively, server device 220 may receive a connection request from remote device 230 and/or provide the request for data to remote device 230, so as to request the data on behalf of client device 210, as described elsewhere herein.

Network device 222 includes one or more devices (e.g., one or more traffic transfer devices) capable of receiving, storing, generating, processing, and/or providing information associated with a request for data. For example, network device 222 may include a router, a gateway, a switch, a hub, a bridge, a firewall, a reverse proxy, a server (e.g., a proxy server), a security device, an intrusion detection device, a load balancer, and/or a similar type of device. In some implementations, network device 222 may include one or more software implementations of a machine (e.g., one or more virtual machines (VMs)), and/or one or more software implementations of a network function (e.g., one or more virtual network functions (VNFs)). Additionally, or alternatively, network device 222 may be connected to one or more other network devices (e.g., one or more VMs, VNFs, or network devices 222).

In some implementations, network device 222 may receive, from client device 210, a request to connect to server device 220 and/or a request for data from remote device 230, as described elsewhere herein. Additionally, or alternatively, network device 222 may process the request and/or provide the data to client device 210, as described elsewhere herein.

Remote device 230 includes one or more devices capable of receiving, generating, storing, processing, and/or providing information associated with a request for data (e.g., data stored by remote device 230). For example, remote device 230 may include a client device, a server device, a network device, and/or a similar type of device. In some implementations, remote device 230 may establish a connection with server device 220 (e.g., via network device 222) and may receive a request for data stored by remote device 230 from server device 220, as described elsewhere herein. Additionally, or alternatively, remote device 230 may provide the requested data to server device 220 (e.g., via network device 222), as described elsewhere herein.

Remote agent component 232 includes one or more components, at least partially implemented in hardware and capable of receiving, generating, storing, processing, and/or providing information associated with a request for data (e.g., data stored by remote device 230). In some implementations, remote agent component 232 may be implemented on remote device 230, installed on remote device 230, executed remotely from remote device 230, and/or the like. In some implementations, when remote device 230 requests to establish a connection to server device 220, remote device 230 may use remote agent component 232 to request to establish the connection, as described elsewhere herein. Additionally, or alternatively, remote agent component 232 may process a request for data stored by remote device 230 and may provide the requested data to server device 220, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210, server device 220, network device 222, remote device 230, and/or remote agent component 232. In some implementations, client device 210, server device 220, network device 222, remote device 230, and/or remote agent component 232 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for accessing data on a remote device. In some implementations, one or more process blocks of FIG. 4 may be performed by server device 220. In some implementations, one or more process blocks of FIG. 4 may be performed by another device, a group of devices separate from or including server device 220, and/or a component of server device 220 or another device, such as client device 210, browser component 212, network device 222, remote device 230, and/or remote agent component 232.

As shown in FIG. 4, process 400 may include receiving, from a client device, located outside of a firewall, and/or from a remote device, located behind the firewall, a connection request to establish a particular type of connection to the client device and/or the remote device (block 410). For example, server device 220 may receive, from remote agent component 232 of remote device 230, located behind a firewall, a first connection request to establish a first type of connection (e.g., a WebSocket connection). In some implementations, the first connection request may be received by network device 222 of server device 220. For example, the first connection request may be received by a particular network device 222 that can forward a request for data to the appropriate remote device 230 (or remote agent component 232 of the remote device 230) (referred to herein as a "WebSocket message router"). In this way, server device 220 may accurately forward data requests to remote device 230, thereby conserving processing resources of server device 220. In some implementations, remote agent component 232 may provide the first connection request from behind a firewall.

In some implementations, the first connection request may include a request to establish a first type of connection (e.g., a WebSocket connection) to server device 220. In some implementations, server device 220 may receive the first connection request when remote device 230 powers on or boots up, based on remote device 230 receiving a command from an administrator associated with remote device 230, based on a pre-defined event occurring, based on sending a request to remote device 230 to connect, and/or the like. In some implementations, server device 220 may store information identifying the connection to remote device 230 (e.g., using a data structure). For example, a WebSocket message router (or another network device 222) implemented on server device 220 may store information identifying the connection to remote agent component 232 using a lookup table. In this way, server device 220 may store information identifying various connections to multiple remote devices 230.

In some implementations, server device 220 may establish a first connection with remote device 230 based on the first connection request. In this way, server device 220 may establish a connection with remote device 230 behind a firewall, thereby permitting access to data behind the firewall.

In some implementations, server device 220 may receive a first set of handlers from remote device 230. For example, network device 222 (e.g., a WebSocket message router) may receive a set of handlers to be registered with network device 222 from remote agent component 232. In some implementations, a set of handlers may include a set of instructions that indicate a manner in which network device 222 is to process data and/or a message when received (e.g., a read message or a write message). Additionally, or alternatively, the set of handlers may define a manner in which data is to be streamed (e.g., between server device 220 and remote device 230).

In some implementations, server device 220 may receive a second connection request from client device 210 (located outside of a firewall). For example, server device 220 may receive the second connection request from browser component 212 of client device 210. Additionally, or alternatively, the second connection request may be received by a particular network device 222 of server device 220 that provides integration or bridging services between multiple protocols (e.g., between HTTP and WebSocket) and may be referred to herein as a "WebSocket-HTTP bridge". In this way, server device 220 may receive different types of connection requests, thereby permitting flexible receipt of connection requests.

In some implementations, the second connection request may include a request to establish a second type of connection. For example, the second connection request may include a request to establish an HTTP connection (e.g., rather than a WebSocket connection). In some implementations, establishing an HTTP connection may be a standard feature of browser component 212, such as when browser component 212 is any standard web browser component. This reduces or eliminates the need for browser component 212 to be specifically configured to connect to server device 220, as would be the case if the second type of connection was a WebSocket connection rather than an HTTP connection.

In some implementations, the request may be made using a uniform resource identifier (URI) (e.g., a uniform resource locator (URL) or a uniform resource name (URN)) of server device 220, and/or network device 222, remote device 230, and/or remote agent component 232). In some implementations, server device 220 may receive the second connection request when client device 210 powers on or boots up, when a user of client device 210 inputs a URL or URN into browser component 212, when a user of client device 210 clicks on a link displayed by browser component 212, when server device 220 request to connect to client device 210, and/or the like. In some implementations, server device 220 may establish a second connection with client device 210 based on the second connection request. In this way, server device 220 may establish a connection to client device 210 located outside of a firewall in addition to establishing a connection to remote device 230 behind the firewall.

In some implementations, server device 220 may establish a connection (e.g., a WebSocket connection) between multiple network devices 222. For example, server device 220 may establish a WebSocket connection between a WebSocket-HTTP bridge of server device 220 and a WebSocket message router of server device 220. In some implementations, based on establishing the connection between the multiple network devices 222, a first network device 222, associated with server device 220, may register a second set of handlers with a second network device 222, associated with server device 220. For example, a WebSocket-HTTP bridge of server device 220 may register the second set of handlers with a WebSocket message router of server device 220. In some implementations, the first network device 222 may establish a data stream (e.g., a duplex data stream) between the first network device 222 and the second network device 222 (e.g., using the second set of handlers).

In this way, server device 220 may receive multiple connection requests to establish different types of connections with devices located behind, and outside of, a firewall. This improves communications between the devices by permitting a device located outside of a firewall to request data from a device behind the firewall.

As further shown in FIG. 4, process 400 may include receiving, from the client device, a request for data stored by the remote device (block 420). For example, server device 220 may receive, from client device 210 (e.g., from browser component 212 of client device 210), a request for data stored by the remote device. In some implementations, server device 220 may receive the request using network device 222, such as a WebSocket-HTTP bridge.

In some implementations, a request for data may include information identifying the data. For example, the request may include a URI, such as a file name, that identifies the data. In some implementations, the information identifying the data may be included in, or received in association with, the connection request from client device 210.

In some implementations, the data may include media data (e.g., video data, audio data, or an image), text data, log data, and/or any other type of data.

In some implementations, the request may include other information related to the data, such as information identifying remote agent component 232, a type of the requested data (e.g., video, audio, or text), a size of the requested data, and/or the like. Additionally, or alternatively, the request may include information identifying a particular portion of the data (e.g., a range of time of a video/audio clip when the data is video/audio data). For example, when the data is video data or audio data and a user of browser component 212 jumps within the video data or the audio data (e.g., from the one-hundredth second of a video or audio clip to the five-hundredth second of the video or audio clip), the information may identify a portion of data starting at the five-hundredth second. In this way, server device 220 may receive a request for a portion of data without receiving a request for all data (e.g., of a video or audio clip), thereby conserving processing resources. In addition, this permits use of a standard HTTP connection feature when requesting data via a WebSocket connection.

In this way, server device 220 may receive a request for data stored behind a firewall by remote device 230.

As further shown in FIG. 4, process 400 may include providing the request for the data to the remote device without providing information identifying the client device (block 430). For example, server device 220 may provide the request for the data to remote device 230 (e.g., from network device 222, such as a WebSocket message router, to remote agent component 232). In some implementations, server device 220 may provide the request via a connection (e.g., a WebSocket connection) between server device 220 and remote device 230.

In some implementations, server device 220 may determine that the request for the data from client device 210 is destined for remote device 230 (e.g., prior to providing the request to remote device 230). For example, a first network device 222 (e.g., a WebSocket-HTTP bridge) may determine that the request is destined for remote agent component 232 using information included in the request. Continuing with the previous example, and in some implementations, the first network device 222 (e.g., a WebSocket-HTTP bridge) may provide the request for the data to a second network device 222 (e.g., a WebSocket message router), which may identify the connection to remote device 230 (e.g., remote agent component 232 of remote device 230) using a lookup table or other data structure.

In some implementations, remote device 230 may receive the request for the data from server device 220. For example, remote agent component 232 may receive the request for the data from network device 222 (e.g., a WebSocket message router). In some implementations, remote device 230 may identify the data in association with receiving the request for the data. For example, remote device 230 may use remote agent component 232 to identify the data using the information included in the request.

In some implementations, remote device 230 (e.g., using remote agent component 232) may create a read stream to read data from a storage location of the data and may identify a write stream to which to write the data to provide the data to server device 220 (e.g., using information included in the request). In some implementations, the write stream may be associated with a connection established between network device 222 of server device 220 (e.g., a WebSocket message router) and remote agent component 232 of remote device 230.

In some implementations, a data stream (e.g., a read stream or a write stream) used to communicate the data may function in a particular manner. In some implementations, the data may be provided in a streaming manner. For example, remote agent component 232 may provide the data via the data stream in portions or chunks (e.g., rather than providing all of the requested data at one time). In some implementations, the portions or chunks may have a particular size (e.g., a threshold size, a pre-defined size, a variable size based on an amount data being sent via the data stream, etc.). For example, the portions or chunks may have a particular quantity of KBs, MBs, etc. In some implementations, when the data is provided in this manner, server device 220 may not store all of the requested data at one time (e.g., prior to providing the data to client device 210). For example, when the data is streamed, or provided, via server device 220, the data may be streamed, or provided, without all of the data being stored on server device 220 at the same time. This conserves memory resources of server device 220 by reducing an amount of data that server device 220 is storing when providing the data.

As an example, assume that the requested data is a 2 MB image. In this case, remote agent component 232 may provide the image in portions or chunks of a threshold size (e.g., 30 KB portions/chunks, 100 KB portions/chunks, 0.5 MB portions/chunks, etc.) via a read/write stream over WebSocket (e.g., rather than providing all 2 MB of the data at once). Providing the data in this manner permits remote agent component 232 to provide data regardless of the size of the data, which would normally limit use of WebSocket or another protocol. In this way, the remote agent component may provide data using WebSocket, or another protocol, regardless of the size of the data via use of a data stream (e.g., a read/write stream over WebSocket).

In some implementations, the data stream may function in a request/provide manner where data (e.g., a chunk of data) is not provided from remote device 230 until requested, such as requested by server device 220. In this way, the data may be provided from remote device 230 as quickly as server device 220 can handle the data. In other words, remote device 230 may provide the data as quickly as the slowest portion of the data stream or data pipeline can handle the data. This improves communication of the data by reducing or eliminating the need to cache the data on server device

220 before providing the data to client device 210, thereby conserving memory resources of server device 220 and/or reducing or eliminating cache overflow.

In some implementations, based on receiving the request, remote device 230 may read the data from a storage location of the data and may provide the data to server device 220. For example, remote agent component 232 may read the data from a file and may provide the data to network device 222 (e.g., a WebSocket message router). In some implementations, when providing the data, remote device 230 may write the data to the write stream and/or provide the data using a data pipeline.

In some implementations, remote device 230 may provide other information related to the data in association with providing the data. For example, remote device 230 may provide information identifying the data, a range of the data (e.g., a time range, an identifier range, etc.), a content type of the data, and/or the like. In some implementations, remote device 230 may provide the data in chunks. For example, remote agent component 232 may provide a fragment or portion of data that may have a header that includes information related to the data (e.g., a parameter, such as a type of chunk, a comment related to the chunk, a size of the chunk, etc.).

In some implementations, remote device 230 may process the data prior to providing the data to server device 220. For example, remote agent component 232 may process the data to prepare the data for consumption prior to providing the data to network device 222 (e.g., a WebSocket message router). In some implementations, remote device 230 may process the data at read time (e.g., after receiving a request for the data and prior to reading the requested data from a storage location of remote device 230). This conserves processing resources of remote device 230 by reducing or eliminating the need for remote device 230 to process data that is not being requested by client device 210. In this way, server device 220 may provide the request for the data to remote device 230 to cause remote device 230 to provide the data.

As further shown in FIG. 4, process 400 may include receiving the data from the remote device without using a tunnel through the firewall (block 440). For example, server device 220 may receive the data from remote device 230 without receiving the data via a tunnel through the firewall. In some implementations, a tunnel (e.g., a proxy tunnel or an HTTP tunnel) may permit data to be pulled through a firewall at a particular port so as to avoid application of a firewall policy that would prevent pulling of the data through the firewall.

In some implementations, network device 222 (e.g., a WebSocket message router) may receive the data from remote agent component 232 without using a tunnel through the firewall. In some implementations, the data may be received via a connection (e.g., a WebSocket connection) established between server device 220 and remote device 230. In some implementations, when server device 220 receives the data using network device 222 of server device 220 (e.g., a WebSocket message router), server device 220 may provide the data to another network device 222 of server device 220 (e.g., a WebSocket-HTTP bridge) and may provide the data via a connection (e.g., a WebSocket connection) established between network device 222 and the other network device 222.

In this way, server device 220 may receive data from remote device 230 located behind a firewall and without using a tunnel through the firewall.

As further shown in FIG. 4, process 400 may include providing the data to the client device (block 450). For example, server device 220 may provide the data to client device 210 for display by client device 210, such as when the data includes video data, text data, metadata associated with audio data, and/or the like. In some implementations, network device 222 (e.g., a WebSocket-HTTP bridge) may provide the data to browser component 212 via a connection (e.g., an HTTP connection) between client device 210 and server device 220. In some implementations, when the connection between client device 210 and server device 220 is an HTTP connection, server device 220 may provide the data by including the data in an HTTP response. In some implementations, server device 220 may provide the data to client device 210 without storing the data, thereby conserving memory and/or storage resources and reducing or eliminating restrictions on the size of the data that can be sent to client device 210 that may exist as a result of limited memory resources of server device 220.

In some implementations, server device 220 and/or client device 210 may perform an action related to the data. In some implementations, server device 220 may perform an action related to the data other than providing the data to client device 210. Additionally, or alternatively, client device 210 may perform an action related to the data other than receiving the data from server device 220.

In some implementations, the action may include performing an analysis or a test. In some implementations, client device 210 and/or server device 220 may perform an analysis of the data, the providing of the data, the receiving of the data, a connection used to provide and/or receive the data, and/or the like. For example, client device 210 and/or server device 220 may measure an amount of bandwidth between devices and/or components used to provide and/or receive the data, a data rate at which data is being exchanged between devices and/or components, and/or the like. In some implementations, client device 210 and/or server device 220 may perform an analysis of, or a test on, a particular type of data. For example, client device 210 and/or server device 220 may perform a test on video data, audio data, text data, log data, etc.

In some implementations, client device 210 and/or server device 220 may store a result of the analysis (e.g., in a log file) and may store the log file. Additionally, or alternatively, client device 210 and/or server device 220 may generate a report that identifies the result of the analysis. In some implementations, client device 210 and/or server device 220 may provide the result of the analysis to another device for display.

In some implementations, server device 220 may perform error handling. For example, server device 220 may determine whether a request for data was successful. In some implementations, server device 220 may provide information to client device 210 that indicates an error related to the request for the data, such as when server device 220 determines that the request for the data was not successful. For example, server device 220 may provide an HTTP response to client device 210 based on the request for the data generating a particular error (e.g., an HTTP 404 response when the requested data cannot be located by remote device 230 or an HTTP 403 response when client device 210 lacks permission to access the requested data).

In some implementations, client device 210 may store the data. Additionally, or alternatively, client device 210 may provide the data for display (e.g., using browser component 212). Additionally, or alternatively, client device 210 may play the data, such as when the data is video data, audio data, and/or other media data.

In some implementations, client device 210 and/or server device 220 may process the data using one or more techniques. In some implementations, client device 210 and/or server device 220 may process video and/or an image using machine learning, pattern recognition, object detection, computer vision, and/or the like to detect an object shown in the video/image, edges of an object shown in the video/image, a pattern shown in a video/image, and/or the like. Additionally, or alternatively, client device 210 and/or server device 220 may process audio data using automatic speech recognition (ASR), computer speech recognition, speech-to-text, a hidden Markov model, and/or a neural network to identify a term and/or a tag included in the audio data.

Additionally, or alternatively, client device 210 may process text data using natural language processing, text analysis, computational linguistics, machine learning, and/or artificial intelligence to identify a term and/or a tag of the text data. For example, client device 210 and/or server device 220 may receive optical character recognition (OCR) data related to a screen shot of a display of a device, and may process the OCR data to identify particular terms and/or tags included in the data. In some implementations, when processing the data, client device 210 and/or server device 220 may process millions or billions of data items. For example, client device 210 and/or server device 220 may process millions or billions of images, millions or billions of lines of text, millions or billions of seconds of audio data and/or the like.

In some implementations, client device 210 and/or server device 220 may perform an action based on processing the data. In some implementations, client device 210 and/or server device 220 may generate a report based on processing the data (e.g., a report that identifies an object, a term, a tag, etc. included in the data). Additionally, or alternatively, client device 210 provide a message to another device (e.g., of a network administrator) identifying a result of processing the data. Additionally, or alternatively, client device 210 may schedule a meeting among network administrators, such as to discuss a result of the processing (e.g., using electronic calendars of the network administrators to identify an available time).

In this way, server device 220 may provide the data to client device 210. In addition, client device 210 and/or server device 220 may perform an action related to the data.

Although implementations described herein relate to data being provided from remote device 230 to client device 210 via a read/write stream over WebSocket, other implementations are possible. In some implementations, server device 220 may receive a request for, or a request to provide, data stored by client device 210 (e.g., rather than receiving a request for data stored by remote device 230). For example, server device 220 may receive the request for data stored by client device 210 from remote device 230. As another example, server device 220 may receive the request to provide data stored by client device 210 from client device 210. Continuing with the previous examples, the data stored by client device 210 may include a test script, such as to test remote device 230, software for remote device 230, and/or the like. In some implementations, when the request is a request for data stored by client device 210, server device 220 may provide the request for the data to client device 210.

In some implementations, server device 220 may provide the data stored by client device 210 to remote device 230 via a read/write stream over WebSocket (e.g., in a streaming manner) when remote device 230 has requested data from client device 210 and/or client device 210 has requested to provide data to remote device 230. This improves exchanging data between client device 210 and remote device 230 by permitting bi-directional exchanges of data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As described herein, implementations enable a client device, outside of a firewall, to obtain data stored by a remote device, behind the firewall, without the need for a tunnel (e.g., a proxy tunnel or an HTTP tunnel) through the firewall. In addition, data may be received by the client device without the need for the remote device to have knowledge of the identity of the requesting client device, and without the need for the remote device to establish a connection with the requesting client device from behind the firewall. In this way, efficiency of obtaining data from behind a firewall is increased (e.g., because the identity of the requesting client device may not be needed by the remote device so as to permit the remote device to push the data from behind the firewall). Further, security may be increased by eliminating the need for a tunnel via the firewall to permit the requesting client device to pull data from behind the firewall.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a first network device,
a second network device,
a memory, and
one or more processors to:
receive multiple connection requests to establish multiple connections between multiple devices,
a first connection request, of the multiple connection requests, being received from a first device, of the multiple devices, located behind a firewall,
a second connection request, of the multiple connection requests, being received from a second device, of the multiple devices, located outside of the firewall, and
the multiple connections including:
a first connection, associated with the first connection request, and
a second connection that is associated with the second connection request;
establish a third connection between the first network device and the second network device based on receiving the first connection request and the second connection request,
the first network device and the second network device being located outside of the firewall,
the first network device registering a set of handlers with the second network device,
the set of handlers including a set of instructions that indicate a manner in which the second network device is to process a message when the message is received, and
the first connection and the third connection being a WebSocket connection;
receive a data request associated with data stored by the first device or the second device based on establishing the third connection,
the data including a plurality of data types,
the plurality of data types including:
video data,
audio data, or
text data, and
the data request associated with the data including information that identifies the first device or the second device as a destination of the data request;
provide the data request to the first device or the second device using the information that identifies the first device or the second device as the destination of the data request based on receiving the data request from the first device or the second device;
receive the data from the first device or the second device based on providing the data request to the first device or the second device,
the data from the first device being received from the first device from behind the firewall in a streaming manner, and/or
the data from the second device being provided to the first device in the streaming manner;
provide, to the first device or the second device, the data based on receiving the data from the first device or the second device; and
perform an action related to the data other than providing the data to the first device or the second device,
where the one or more processors, when performing the action, are to:
process the data based on a first data type, of the plurality of data types, and a second data type, of the plurality of data types,
the first data type being different than the second data type, and
generate a report based on processing the data based on the first data type and the second data type.

2. The device of claim 1, where the streaming manner includes receiving or providing the data in portions or chunks.

3. The device of claim 1, where the data is streamed via the device without all of the data being stored on the device at a same time.

4. The device of claim 1, where:
the second connection between the second network device and the second device is a hypertext transfer protocol (HTTP) connection.

5. The device of claim 1, where the one or more processors, when performing the action, are to:
perform a test on the data based on providing the data to the first device or to the second device.

6. The device of claim 1, where the one or more processors, when performing the action, are to:
measure an amount of bandwidth between the device and the first device;
measure an amount of bandwidth between the device and the second device; and
generate another report that identifies the amount of bandwidth between the device and the first device and the amount of bandwidth between the device and the second device.

7. The device of claim 1, where the one or more processors, when performing the action, are to:
measure a data rate at which data is being exchanged between the device and the first device; and
measure a data rate at which data is being exchanged between the device and the second device; and
generate another report that identifies the data rate at which data is being exchanged between the device and the data rate at which data is being exchanged between the device and the second device.

8. A method, comprising:
receiving, by a first device, a plurality of connection requests to establish communications between a second device located behind a firewall and a third device located outside of the firewall,
the first device being located outside of the firewall,
the second device and the third device storing data to be requested,
a first connection being established between the first device and the second device based on the plurality of connection requests,
a second connection being established between the first device and the third device based on the plurality of connection requests;

establishing, by the first device, a third connection between a first network device and a second network device based on receiving a first connection request, of the plurality of connection requests, to establish the first connection and a second connection request, of the plurality of connection requests, to establish the second connection,
the first network device and the second network device being implemented on the first device,
the first network device and the second network device being located outside of the firewall,
the first network device registering a set of handlers with the second network device,
the set of handlers including a set of instructions that indicate a manner in which the second network device is to process a message when the message is received, and
the first connection and the third connection being a WebSocket connection;
receiving, by the first device and from the second device or the third device, a data request for the data stored by the second device or the third device based on receiving the plurality of connection requests,
the data request for the data stored by the second device being received via the second connection, or
the data request for the data stored by the third device being received via the first connection;
providing, by the first device, the data request via the first connection or the second connection based on receiving the data request;
receiving, by the first device, the data based on providing the data request,
the data stored by the second device being received by the first device from behind the firewall without using a tunnel through the firewall and in a streaming manner;
providing, by the first device, the data based on receiving the data,
the data stored by the third device being provided to the second device in the streaming manner;
processing, by the first device, the data based on a first data type, of a plurality of data types, and a second data type, of the plurality of data types,
the plurality of data types including:
video data,
audio data, or
text data, and
the first data type being different than the second data type; and
generating, by the first device, a report based on processing the data based on the first data type and the second data type.

9. The method of claim 8, wherein
the second connection being a hypertext transfer protocol (HTTP) connection; and
where providing the data request comprises:
providing the data request after establishing the first connection and the second connection.

10. The method of claim 9, where receiving the data request for the data comprises:
receiving the data request for the data via the HTTP connection; and
where providing the data request comprises:
providing the data request via the WebSocket connection.

11. The method of claim 8, further comprising:
receiving, by the first network device, one or more sets of instructions from the second device or the second network device based on establishing the first connection,
the one or more sets of instructions being related to establishing a data stream between the first device and the second device; and
registering the one or more sets of instructions with the first network device based on receiving the one or more sets of instructions.

12. The method of claim 11, further comprising:
establishing the data stream between the first device and the second device using the one or more sets of instructions based on registering the one or more sets of instructions; and
where receiving the data comprises:
receiving the data via the data stream based on establishing the data stream.

13. The method of claim 8, where receiving the data further comprises:
receiving the data via the first connection based on providing the data request to the second device; and
where providing the data further comprises:
providing the data from the first network device to the second network device via the third connection based on receiving the data; and
providing the data by the second network device to the third device via the second connection based on providing the data to the second network device,
the second connection being a hypertext transfer protocol (HTTP) connection.

14. The method of claim 8, further comprising:
performing a test on video data based on providing the data.

15. A non-transitory computer-readable medium storing instructions, the instructions comprising:
one or more instructions that, when executed by one or more processors, cause the one or more processors to:
receive one or more requests to establish one or more connections between multiple devices,
a first connection of the one or more connections being associated with connecting to a first device located behind a firewall,
a second connection of the one or more connections being associated with connecting to a second device located outside of the firewall,
the one or more connections to be used to provide data to or from the first device without using a tunnel through the firewall;
establish a third connection between a first network device and a second network device based on receiving a first connection request, of the one or more requests to establish the one or more connections, and a second connection request, of the one or more requests to establish the one or more connections,
the first network device and the second network device being implemented by the one or more processors,
the first network device and the second network device being located outside of the firewall,
the first network device registering a set of handlers with the second network device,
the set of handlers including a set of instructions that indicate a manner in which the second network device is to process a message when the message is received, and the first connection and the third connection being a WebSocket connection;
receive a data request for the data after receiving the one or more requests,
process the data request to identify the first device or the second device as a destination for the data request based on receiving the data request;
provide the data request to the first device or the second device based on processing the data request;
receive the data from the first device or the second device based on providing the data request to the first device or the second device,
the data from the first device being received from behind the firewall and in a streaming manner,
the data including a plurality of data types,
the plurality of data types including:
video data,
audio data, or
text data;
provide the data to the first device or the second device based on receiving the data from the first device or the second device,
the data provided to the first device being provided in the streaming manner; and
perform an action related to the data other than providing the data to the first device or the second device,
where the one or more processors, when performing the action, are to:
process the data based on a first data type, of the plurality of data types, and a second data type, of the plurality of data types,
the first data type being different than the second data type, and
generate a report based on processing the data based on the first data type and the second data type.

16. The non-transitory computer-readable medium of claim 15, where the one or more instructions, that cause the one or more processors to receive the data, cause the one or more processors to:
receive the data from the first device via a read stream based on providing the data request to the first device; and
where the one or more instructions, that cause the one or more processors to provide the data to the second device, cause the one or more processors to:
provide the data to the second device via a write stream based on receiving the data via the read stream.

17. The non-transitory computer-readable medium of claim 16, where the write stream includes a data stream that uses a hypertext transfer protocol (HTTP) response to provide the data.

18. The non-transitory computer-readable medium of claim 15, where the second connection is of a different protocol than a WebSocket connection.

19. The non-transitory computer-readable medium of claim 15, where the one or more instructions, when executed by the one or more processors, further cause the one or more processors to:
perform a test on video data based on providing the data.

20. The non-transitory computer-readable medium of claim 15, where the device receives the first connection request when the first device powers on or boots up.

* * * * *